United States Patent
Sikora et al.

(10) Patent No.: US 12,487,130 B2
(45) Date of Patent: Dec. 2, 2025

(54) DEVICE AND METHOD FOR DETERMINING THE TEMPERATURE OF A TUBULAR STRAND

(71) Applicant: Sikora AG, Bremen (DE)

(72) Inventors: Harald Sikora, Bremen (DE); Christian Frank, Bremen (DE)

(73) Assignee: Sikora AG, Bremen (DE)

( * ) Notice: Subject to any disclaimer, the term of this patent is extended or adjusted under 35 U.S.C. 154(b) by 513 days.

(21) Appl. No.: 17/794,869

(22) PCT Filed: Jan. 11, 2021

(86) PCT No.: PCT/EP2021/050382
§ 371 (c)(1),
(2) Date: Jul. 22, 2022

(87) PCT Pub. No.: WO2021/148269
PCT Pub. Date: Jul. 29, 2021

(65) Prior Publication Data
US 2023/0102027 A1    Mar. 30, 2023

(30) Foreign Application Priority Data

Jan. 24, 2020  (DE) .................... 10 2020 101 724.3

(51) Int. Cl.
*G01K 3/14*     (2006.01)
*B29C 48/09*    (2019.01)
(Continued)

(52) U.S. Cl.
CPC ............. *G01K 3/14* (2013.01); *B29C 48/09* (2019.02); *B29C 48/11* (2019.02); *B29C 48/92* (2019.02);
(Continued)

(58) Field of Classification Search
CPC .......... G01K 3/14; G01K 13/06; B29C 48/09; B29C 48/11; B29C 48/92; B29C 48/12;
(Continued)

(56) References Cited

U.S. PATENT DOCUMENTS 3,728,424 A * 4/1973 Bauer .................... H01B 13/14
                                                 264/237
4,480,981 A * 11/1984 Togawa ................... B29C 48/06
                                                 425/162
(Continued)

FOREIGN PATENT DOCUMENTS

DE    1218710 B     6/1966
DE    3140253 A1    4/1983
(Continued)

OTHER PUBLICATIONS

Japanese Patent Office; Japanese Application No. 2022-536827; Notification of Reasons for Refusal; Dispatch Date Oct. 3, 2024 (5 pages).
(Continued)

*Primary Examiner* — Laura Martin
*Assistant Examiner* — Philip L Cotey
(74) *Attorney, Agent, or Firm* — Barclay Damon LLP

(57) ABSTRACT

A device for determining the temperature of a tubular strand conveyed out of an extrusion device includes at least one temperature sensor configured to measure a first temperature of an outside of the tubular strand at a first position of the tubular strand. An evaluation apparatus further included and configured to compare the first temperature with a second temperature of the outside of the tubular strand at a second position of the tubular strand and determine at least one of a temperature within the tubular strand or a temperature on (Continued)

the inside of the tubular strand at a position of the tubular strand based on the comparison of the first and second temperature.

27 Claims, 1 Drawing Sheet

(51) Int. Cl.
| | |
|---|---|
| *B29C 48/11* | (2019.01) |
| *B29C 48/92* | (2019.01) |
| *G01K 13/06* | (2006.01) |
| *B29C 48/12* | (2019.01) |
| *B29C 48/88* | (2019.01) |
| *B29L 31/00* | (2006.01) |
| *G01J 5/00* | (2022.01) |

(52) U.S. Cl.
CPC .............. *G01K 13/06* (2013.01); *B29C 48/12* (2019.02); *B29C 48/911* (2019.02); *B29C 2948/92123* (2019.02); *B29C 2948/92152* (2019.02); *B29C 2948/92209* (2019.02); *B29C 2948/92247* (2019.02); *B29C 2948/92447* (2019.02); *B29C 2948/92704* (2019.02); *B29L 2031/731* (2013.01); *G01J 5/0022* (2013.01)

(58) Field of Classification Search
CPC ......... B29C 48/911; B29C 2948/92123; B29C 2948/92152; B29C 2948/92209; B29C 2948/92247; B29C 2948/92447; B29C 2948/92704; B29L 2031/731; G01J 5/0022
See application file for complete search history.

(56) References Cited

U.S. PATENT DOCUMENTS

| | | | | |
|---|---|---|---|---|
| 5,097,431 | A * | 3/1992 | Harada | B29C 45/7693 700/202 |
| 5,991,485 | A * | 11/1999 | Kertscher | G02B 6/4486 385/100 |
| 6,620,354 | B1 | 9/2003 | Bessemer | B29C 48/911 264/209.4 |
| 8,105,065 | B2 * | 1/2012 | Sikora | G01K 11/24 425/170 |
| 8,298,461 | B2 * | 10/2012 | Sikora | G01K 13/06 264/40.7 |
| 9,261,417 | B2 * | 2/2016 | Sikora | G05D 23/19 |
| 11,584,058 | B2 * | 2/2023 | Rausch | B29D 23/18 |
| 2003/0211189 | A1 * | 11/2003 | Eiva | B29C 48/832 425/162 |
| 2010/0096767 | A1 * | 4/2010 | Sikora | B29B 7/726 425/170 |
| 2012/0016622 | A1 * | 1/2012 | Jiang | G01K 7/42 702/130 |
| 2012/0080813 | A1 * | 4/2012 | Sikora | G01K 13/06 264/40.1 |
| 2013/0223476 | A1 * | 8/2013 | Sikora | B29C 48/156 374/100 |
| 2014/0322378 | A1 * | 10/2014 | Paoletti | B29C 48/03 425/170 |
| 2017/0190091 | A1 * | 7/2017 | Paoletti | H04N 19/12 |
| 2018/0111301 | A1 * | 4/2018 | Lin | B29C 48/09 |
| 2018/0194055 | A1 * | 7/2018 | Nerling | B29C 48/09 |
| 2020/0238587 | A1 * | 7/2020 | Rausch | B29C 48/022 |
| 2021/0114278 | A1 * | 4/2021 | Holle | B29C 48/90 |

FOREIGN PATENT DOCUMENTS

| | | |
|---|---|---|
| DE | 102006056735 A1 | 5/2008 |
| DE | 102008037875 A1 | 2/2010 |
| DE | 102009004946 A1 | 4/2010 |
| DE | 102017116955 B3 | 11/2018 |
| DE | 202018006144 U1 | 6/2019 |
| EP | 2153970 A2 | 2/2010 |
| EP | 2153970 A3 | 1/2014 |
| EP | 3480553 A1 | 5/2019 |
| GB | 1145911 | 3/1969 |
| JP | H1096704 A | 4/1998 |
| JP | 2000343588 A | 12/2000 |
| JP | 2003-117987 A | 4/2003 |
| JP | 2005-106766 A | 4/2005 |
| JP | 2010008312 A | 1/2010 |
| KR | 10-1990-0008266 A1 | 6/1990 |
| RU | 2010714 C1 | 4/1994 |
| WO | 2016139155 A1 | 9/2016 |
| WO | 2019166420 A1 | 9/2019 |

OTHER PUBLICATIONS

Japanese Patent Office; Japanese Application No. 2022-536827; English translation of Notification of Reasons for Refusal; Dispatch Date Oct. 3, 2024 (4 pages).
DE 102020101724, Filed Jan. 24, 2020; German Office Action issued Sep. 14, 2022 (7 pages).
RU 2022120322/05(042803); filed Jan. 11, 2021; Office Action dated Feb. 20, 2023 (6 pages).
JP 2022-536827, Filed May 14, 2020; Notification of Reasons for Refusal, Dispatch Date Jan. 30, 2024 (6 pages).
JP 2022-536827, Filed May 14, 2020; English translation of Notification of Reasons for Refusal, Dispatch Date Jan. 30, 2024 (5 pages).
Chitose Institute of Science and Technology Photonics Research Institute, vol. 5, No. 1, Chitose Institute of Science and Technology (Mar. 31, 2015) p. 9.
Chinese National Intellectual Property Administration; Notification of Second Office Action; Appl. No. 202180007511.4; Dated: Aug. 21, 2024; 8 pages.
Chinese National Intellectual Property Administration; Notification of Second Office Action; English Translation; Appl. No. 202180007511. 4; Dated: Aug. 21, 2024; 10 pages.
PCT/EP2021/050382, International Filing Date Jan. 11, 2021; International Search Report and Written Opinion, Date of Mailing Apr. 30, 2021 (11 pages).
PCT/EP2021/050382, International Filing Date Jan. 11, 2021, English Translation of International Search, Date of Mailing Apr. 30, 2021 (3 pages).
Korean Patent Office; Korean Application No. 10-2022-7024407; Issued Jan. 7, 2025; 12 pages.
Korean Patent Office; Korean Application No. 10-2022-7024407; Issued Jan. 7, 2025; 14 pages (English Translation).

* cited by examiner

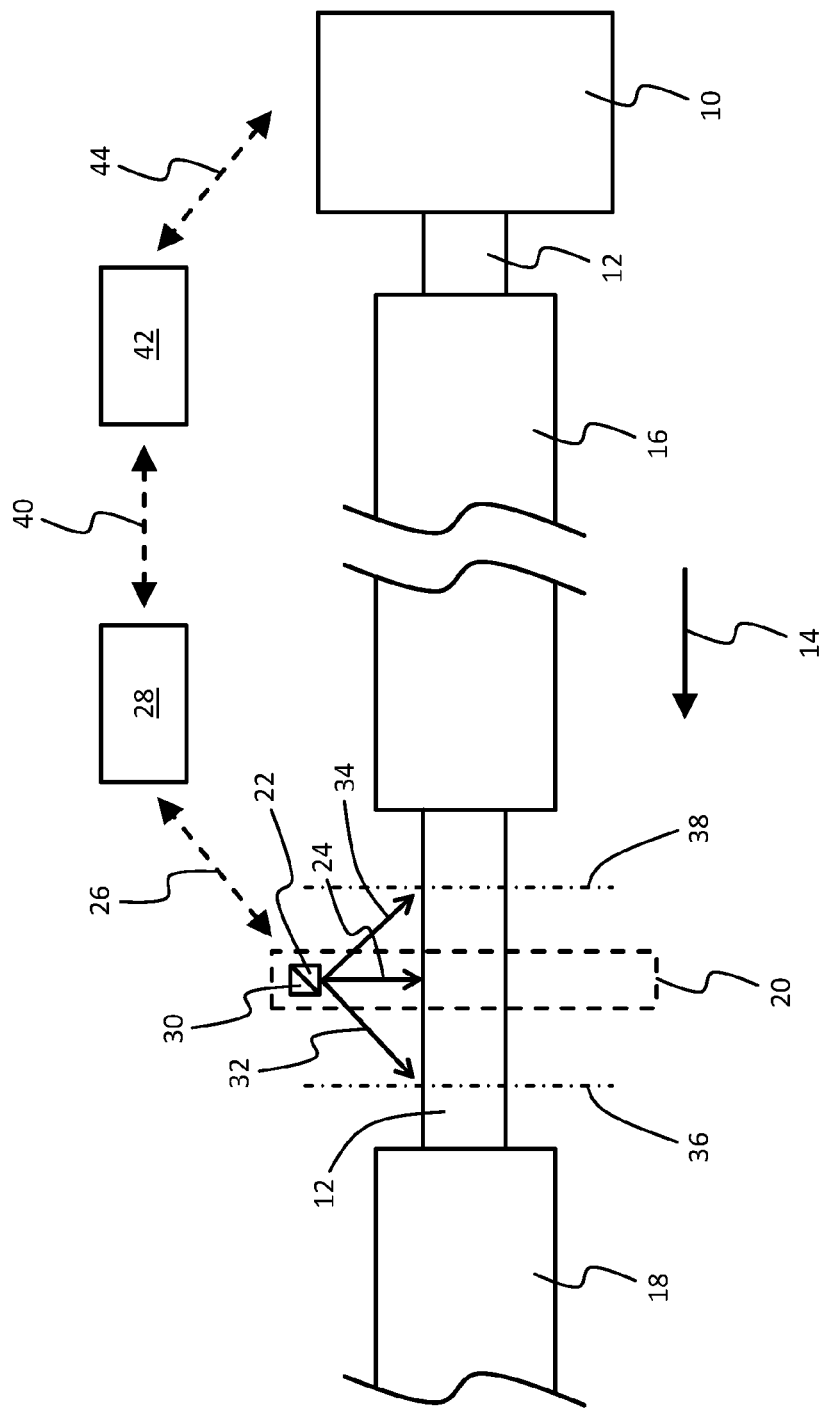

DEVICE AND METHOD FOR DETERMINING THE TEMPERATURE OF A TUBULAR STRAND

CROSS REFERENCE TO RELATED INVENTION

This application is a national stage application pursuant to 35 U.S.C. § 371 of International Application No. PCT/EP2021/050382, filed on Jan. 11, 2021, which claims priority to, and benefit of, German Patent Application No. 10 2020 101 724.3, filed Jan. 24, 2020, the entire contents of which are hereby incorporated by reference.

FIELD OF TECHNOLOGY

The current disclosure relates to a device and a method for determining the temperature of a tubular strand conveyed out of an extrusion device.

BACKGROUND

In extrusion devices, plastic tubes, for example, are extruded. After exiting from the extrusion device, they typically pass through a calibration apparatus with a, for example, metallic calibration sleeve, against the inner face of which the plastic tube is pressed, for example suctioned, to specify the outer geometry. Typically, subsequently to the calibration apparatus, the plastic tubes also pass through one or more cooling sections in which cooling liquid, such as cooling water, is sprayed onto the outside of the tube to cool the tube.

The basic goal of an extrusion process for producing a tubular strand is to achieve minimal sagging, meaning a minimal wall thickness deviation of the completely produced strand over its circumference, a minimal energy input, and a maximal conveying speed of the extruded strand. Exact knowledge of the production process is crucial for optimizing these parameters. For example, a measurement of various geometry parameters, for example, the wall thickness, of a tubular strand is known from WO 2016/139155 A1. In this case, terahertz radiation in the range from 10 GHz to 3 THz is emitted onto the strand to be measured and terahertz radiation reflected from the boundary surfaces of the strand is received again. For example, using travel time measurements, distances to the boundary surfaces and, from this, geometry parameters such as diameter and wall thicknesses can be reliably determined. In addition to the geometric parameters to be measured in this manner, the temperature of the tubular strand is also an important process parameter. For contactless measurement of the surface temperature, pyroelectric sensors (PIR sensors) are known. For example, in WO 2019/166420 A1 it is proposed to measure the temperature on the inner circumference of the tubular strand by means of a measuring apparatus guided into the interior of the tubular strand directly following the extrusion device. Inserting a sensor into the inside of the tubular strand, however, is not simple. In addition, this is basically only possible directly following the extrusion device.

BRIEF SUMMARY OF THE INVENTION

Starting from the explained prior art, the object of the invention is to provide a device and a method with which more exact information, in particular about the temperature of the tubular strand, can be obtained to optimize the production process. In particular, it is also the object of the invention to improve the measuring accuracy during the calculation of the diameter and/or the wall thickness of the tubular strand at the measurement location, as well as its length, its wall thicknesses, and its diameter after the cooling of the tubular strand.

For a device of the type mentioned above, the invention achieves the object in that a first temperature sensor is provided for measuring a first temperature of the outside of the tubular strand at a first position of the tubular strand, and that an evaluation apparatus is provided which is designed to compare the first temperature with a second temperature of the outside of the tubular strand at a second position of the tubular strand, spaced apart from the first position in the conveying direction of the tubular strand, and to determine the temperature within the tubular strand and/or on the inside of the tubular strand at a position of the tubular strand from the comparison of the first and second temperatures.

For a method of the type mentioned above, the invention achieves the object in that a first temperature of the outside of the tubular strand is measured at a first position of the tubular strand, that the first temperature is compared with a second temperature of the outside of the tubular strand at a second position of the tubular strand, spaced apart from the first position in the conveying direction of the tubular strand, and that the temperature within the tubular strand and/or on the inside of the tubular strand is determined at a position of the tubular strand from the comparison of the first and second temperatures.

An embodiment of the device according to the invention can comprise the extrusion device and/or a conveying apparatus for conveying the tubular strand. The device according to the invention can also comprise the tubular strand. The tubular strand can be, for example, a plastic tube. However, it can also be, for example, a glass fiber tube or another strand. The device according to the invention can comprise one or more cooling sections, through which the tubular strand passes after the extrusion, and in which, for example, a cooling liquid is sprayed onto the outside of the strand for cooling. The device according to the invention can also comprise a calibration apparatus, comprising, for example, a calibration sleeve, for example made of metal, against the inside of which the tubular strand is pressed, for example suctioned, after leaving the extrusion device. Any cooling sections can be located in particular downstream of the calibration apparatus.

According to an embodiment, a first temperature of the outside of the tubular strand is measured at a first position of the tubular strand by means of a first temperature sensor. The measured first temperature is compared with a second temperature of the outside of the tubular strand at a second position of the tubular strand, wherein the second position is spaced apart from the first position in the conveying direction of the tubular strand. The first and second positions are positions along the conveying direction of the strand. The positions are spaced apart from each other in the longitudinal direction of the strand. The second position can be arranged, for example, upstream of the first position in the conveying direction of the strand. However, it can also be arranged downstream of the first position in the conveying direction. The temperatures at the first and second positions can be measured or respectively determined in particular at the same time. However, this is not mandatory. Rather, it would also be possible to measure or respectively determine the first and second temperatures at different points in time so that, for example, taking into account the conveying speed of the strand, the same strand region is measured.

The second temperature can be measured or assumed as known or respectively determined in another manner. For example, the temperature of a calibration sleeve, against which the strand is pressed to define its outer geometry, at the outlet of a calibration apparatus can be assumed as the outer temperature of the strand at this position. The strand cools after the extrusion. The cooling is typically strengthened or respectively controlled by one or more cooling sections which the strand passes through. The cooling sections typically affect the outside of the strand and introduce a forced cooling into the material. As a result, in particular shortly after passing through a cooling section, the strand initially possesses a lower temperature on its outside than in its interior, in particular on its inside, which is not directly influenced by the cooling. After the end of the outer cooling, meaning after leaving the cooling section and the end of the forced cooling, the higher temperature prevailing in the interior of the strand spreads outwards again. As a result, the outer temperature of the strand initially increases again after the cooling. The temperature of the strand in its interior, in particular on its inside, can be inferred from the level of this temperature increase. To determine the temperature within the tubular strand and/or on the inside of the tubular strand, in particular the conveying speed of the strand, the thermal conductivity, and the thermal capacity of the strand material as well as the wall thickness of the tubular strand are known for the calculation in addition to the positions of the compared first and second temperatures. On the basis of these parameters, a temperature difference between the outside of the strand and the inside of the strand and thus the temperature on the inside and also in the interior of the strand can be inferred from the temperature comparison. Any energy output of the tubular strand to the surroundings can be disregarded here. In this manner, the interior temperature of the strand can be reliably ascertained by means of a temperature measurement, which is simple and flexible to implement, of the outside of the strand even without arranging a sensor in the interior of the strand, and thus also far downstream of the extrusion device. In turn, valuable information about the production process can be gained from this and used as control or regulation variables for the process. The optimization of the parameters mentioned above of minimal sagging, minimal energy input, and maximal conveying speed of the tube is thus more easily possible. If the expansion coefficient is known, the expected dimensions of the tubular strand after its cooling can also be more precisely determined. If the temperature in the wall thicknesses of the tubular strand is known, its temperature-dependent damping of the terahertz radiation and the change of the refractive index in the analysis of the wall thicknesses and diameter values can also be taken into account.

The position at which the temperature within the tubular strand and/or on the inside of the tubular strand is determined can be a third position which is spaced apart from the first position and the second position in the conveying direction of the tubular strand. For the computational evaluation, however, it can be simpler when the position at which the temperature within the tubular strand and/or on the inside of the tubular strand is determined is the same as the first position or the same as the second position. This position can be, for example, the same as the one of the first and second positions which is arranged closer to the extrusion device in the conveying direction of the strand.

According to one embodiment, the second temperature can also be measured. A second temperature sensor can be provided for this purpose. A particularly reliable determination of the interior temperature is possible by means of the measurement of the second temperature which also takes place.

It is possible according to another embodiment that the first temperature sensor is also designed to measure the second temperature. Then, in a particularly favorable manner, only one temperature sensor is necessary. The use of only one temperature sensor can be advantageous also with regard to measurement reliability, since no falsifications of the measurement result are expected due to difference characteristics or respectively changes in the temperature sensors.

In an embodiment, at least the first temperature sensor can be a contactless temperature sensor, in particular a pyroelectric sensor (PIR sensor). If a second temperature sensor is also provided, this can also be a contactless temperature sensor, in particular a pyroelectric sensor. Such sensors offer a simple and reliable contactless measurement even when the objects being measured are very hot. In addition, with this sensor technology, a temperature measurement at various positions with only one temperature sensor which then detects thermal radiation of the outer surface of the strand at various angles is possible in a simple manner. It is particularly advantageous when the temperature sensor absorbs the thermal radiation of the strand surface at identical angles, meaning symmetrically. As a result, falsifications of the measurement result due to a different detection angle are avoided.

According to another embodiment, at least the first temperature sensor can be arranged such that the first temperature is measured after the tubular strand has passed through a cooling section arranged downstream of the extrusion device. If a second temperature sensor is also present, it can be arranged such that the second temperature is also measured after the tubular strand has passed through a cooling section arranged downstream of the extrusion device. As explained, the outside of the strand is sprayed by cooling liquid, for example cooling water, for cooling in the cooling section. In particular, the first temperature sensor and, if applicable, a second temperature sensor can be arranged such that the first temperature or respectively the second temperature is measured after the tubular strand has passed through a first cooling section arranged downstream of the extrusion device and before the tubular strand passes through a second cooling section arranged downstream of the first cooling section. Thus, a measurement between two cooling sections then takes place. As explained above, the measuring method according to the invention allows, in particular after completion of a (first) cooling of the outside of the strand, a reliable determination of the interior temperature of the strand on the basis of a reheating of the outside of the strand taking place after completion of the cooling.

According to a particularly practical embodiment, the evaluation apparatus can be configured to determine the temperature within the tubular strand and/or on the inside of the tubular strand from the comparison of the first and second temperatures using an in particular iterative finite element method. Such finite element methods, which are known per se to the person skilled in the art, represent numerical calculation methods in which the body to be calculated, here the tubular strand, is divided into a finite number of subregions. The physical behavior of these, called finite elements, can be calculated well with known trial functions due to their regularly simple geometry. The physical behavior of the entire body, here the spread of the higher interior temperature to the outside of the tubular strand, can be modeled well in this manner. With small wall thicknesses compared to the diameter of the tubular strand, a linear temperature curve between the inside and the outside of the tubular strand can be assumed in a good approximation. This simplifies the computational determination of the interior temperature. As an iterative calculation method for calculating the interior temperature, an interior temperature can be assumed, for example, in the first step and it can be calculated using the finite element method whether this interior temperature matches with the measured outer temperature. If this is not the case, the assumed interior temperature is changed and the computational check is made again. In this manner, the actual interior temperature can be determined iteratively.

According to another embodiment, it can be provided that the first temperature sensor measures the first temperature at multiple locations distributed over the circumference of the tubular strand at the first position, and that the evaluation apparatus is configured to compare the temperature measured at multiple locations distributed over the circumference of the tubular strand with the second temperature at multiple locations distributed over the circumference of the tubular strand at the second position, and to determine the temperature within the tubular strand and/or on the inside of the tubular strand at multiple locations distributed over the circumference of the tubular strand at the position of the tubular strand from the comparison. The second temperature can also be measured at multiple locations distributed over the circumference of the tubular strand at the second position, whether by the first temperature sensor or a possibly provided second temperature sensor. By measuring and determining the temperature over the circumference, additional important information about the production process can be gained, in particular an unequal temperature distribution over the circumference, which delivers, on the one hand, an indicator of the degree of sagging of the tubular strand and, on the other hand, suggests insufficient cooling in discrete regions of the circumference of the tube.

It can also be provided that at least the first temperature sensor can be rotated or respectively is rotated at least in portions over the circumference of the tubular strand. If a second temperature sensor is also provided, it can also be rotatable or be rotated over the circumference of the tubular strand. However, it would also be possible, for example, that one temperature sensor is configured to be rotatable and the other temperature sensor is fixed. The rotatability or respectively the rotation of the first and/or second temperature sensor can of course be present or respectively take place over the entire circumference. The first and/or second temperature can be measured at discrete locations over the circumference or basically continuously over the circumference. By determining the temperature over the circumference of the tubular strand, the factors mentioned above of minimal sagging, meaning minimal undesired wall thickness deviation between an upper and a lower wall portion, minimal energy input, and maximal conveying speed of the strand can be optimized even better.

According to another embodiment, the evaluation apparatus can be configured to determine the temperature of the tubular strand at multiple locations within the tubular strand at the position of the tubular strand at which the temperature within the tubular strand and/or on the inside of the tubular strand is determined. Thus, a temperature profile in the radial strand direction can be determined, from which additional important information about the production process can be obtained. The determination of the temperature in the interior of the tubular strand can be calculated numerically here in a particularly practical manner by a finite element method, as explained, since in this method the tubular strand is divided anyway into multiple subregions, for example, in the radial direction. For these individual subregions, the temperature and thus a radial temperature profile of the tubular strand can then be determined.

According to another embodiment, a diameter and/or wall thickness measuring apparatus can be provided which measures the diameter and/or the wall thickness of the tubular strand at the first position and/or the second position of the tubular strand. The evaluation apparatus can then be configured to take into account the measured diameter and/or the measured wall thickness when determining the temperature within the tubular strand and/or on the inside of the tubular strand. The evaluation apparatus can also be configured to take into account the temperature within the tubular strand and/or on the inside of the tubular strand and, if applicable, the temperature of the outside of the tubular strand at the first and/or second position when determining the diameter and/or the wall thickness. Thus, the temperature of the strand material is an important value for determining geometry parameters of the strand. For example, the refractive index of the strand material is temperature-dependent. At the same time, the refractive index is an important parameter when determining the wall thickness of the strand, for example by means of a terahertz radiation measuring apparatus. According to a particularly practical embodiment, the diameter and/or wall thickness measuring apparatus can comprise a terahertz radiation measuring apparatus. As explained above, the diameter and wall thickness are important parameters of the production process. In addition, an exact knowledge of the diameter or respectively the wall thickness can be important for an exact determination of the temperature within or on the inside of the tubular strand, since the diameter and in particular the wall thickness influences the degree to which a higher interior temperature of the strand spreads to the outside. The diameter and/or the wall thickness could be assumed as known as parameters for the calculation, in principle. However, with the aforementioned embodiment, the exactness of the temperature determination is increased, since the actual diameter or respectively the actual wall thickness is measured and thus any deviations from an expected diameter or respectively an expected wall thickness are taken into account. The diameter and/or wall thickness measurement can take place, for example, as a travel time measurement of terahertz radiation reflected from boundary surfaces of the strand, in particular the outside and inside of the strand. For this purpose, the terahertz radiation measuring apparatus can comprise, for example, a terahertz transceiver which thus comprises a terahertz transmitter and a terahertz receiver. The terahertz radiation measuring apparatus can be rotated about the strand so that the diameter or respectively the wall thickness can be determined at multiple locations arranged distributed over the circumference of the strand. In a particularly simple manner, the first and/or second temperature sensor can be integrated into the terahertz radiation measuring apparatus. It can then also be rotated together with it, if applicable. It can thus be determined in a particularly simple manner that the diameter or respectively the wall thickness and the temperature are measured at the same locations over the circumference of the strand. The diameter and/or wall thickness measuring apparatus can be configured, for example, as explained in WO 2016/139155 A1.

According to another embodiment, the evaluation apparatus can also be configured to ascertain an expected shrinkage of the tubular strand on the basis of the temperature-dependent expansion coefficient of the material of the tubular strand starting from the position of the tubular strand at which the temperature within the tubular strand and/or on the inside of the tubular strand is determined, until it reaches its final shape. The strand material shrinks in the course of its cooling until it reaches its final shape, for example when the strand has reached room temperature. If the temperature-dependent expansion coefficient of the strand material is known, the shrinkage expected until the final shape of the strand is reached can be determined according to the aforementioned embodiment, meaning based on the temperature of the strand ascertained according to the invention within the tubular strand and/or on the inside of the tubular strand and, if applicable, also taking into account the measured temperature on the outside. This, in turn, can be used in an advantageous manner to predict certain geometry parameters of the strand after reaching its final shape. Thus, according to another embodiment, the evaluation apparatus can also be configured to ascertain a diameter and/or a wall thickness of the tubular strand after reaching its final shape, taking into account the diameter measured at the first position and/or the second position of the tubular strand and/or the measured wall thickness of the tubular strand and taking into account the ascertained expected shrinkage.

According to another embodiment, the evaluation apparatus can be configured to determine the refractive index of the material of the tubular strand based on the determined temperature. The refractive index is known to be temperature-dependent. This means that the refractive index of the strand material at the position or respectively at the location of the temperature determination can be inferred from the temperature measurement. This can be taken into account, for example, during a wall thickness measurement which uses the refractive index as a parameter. The wall thickness measurement is possible to a more exact extent as a result. For example, the refractive index can be determined at multiple locations distributed over the wall thickness of the strand. A refractive index distribution can thus be ascertained. The refractive index can also be ascertained at multiple locations distributed over the circumference of the strand and from this a refractive index distribution can also be ascertained. Additional valuable information for the production process can be gained from these refractive index distributions, for example, the composition of the material and its consistency over the production process. In addition, the temperature-dependent absorption of the terahertz radiation can be determined and, inversely, a prediction for the expected absorption can be derived by the measurement of the average tube temperature. If tubes are manufactured from materials in which a strong temperature-dependent increase in the absorption is present, it can be ensured by measuring and limiting the temperature of the material that reliable wall thickness and diameter measurement values can be generated. With knowledge of the temperature-dependent expansion coefficient of the material, it can also be derived to which extent its shrinkage from the measurement location will be expected at a higher room temperature of the material until its final cooling.

According to another embodiment, the device can also comprise a control and/or regulation apparatus which controls and/or regulates the extrusion device on the basis of the determined temperature within the tubular strand and/or on the inside of the tubular strand. In this manner, an improved control or respectively regulation of the process, in particular of the extrusion device, is possible on the basis of the information gained according to the invention.

The device according to the invention can be configured to perform the method according to the invention. The method according to the invention can be performed with the device according to the invention accordingly.

BRIEF DESCRIPTION OF THE DRAWINGS

An exemplary embodiment of the invention is explained in greater detail below based on a drawing.

FIG. 1 schematically shows a device according to the invention in a side view.

DETAILED DESCRIPTION OF THE INVENTION

The device shown in FIG. 1 comprises an extrusion device 10 with a conveying apparatus. A tubular strand 12, in the present case a plastic tube 12, exiting from the extrusion device 10 is conveyed along its longitudinal axis in a conveying direction 14. In doing so, the strand 12 passes through a first cooling section 16 and a second cooling section 18, in each of which a cooling liquid is sprayed onto the outside of the strand 12 for cooling. Between the extrusion device 10 and the first cooling section 16, a calibration apparatus (not shown) with a, for example, metallic calibration sleeve can be arranged, against the inner wall of which the strand 12 is pressed, for example suctioned, for the outer shaping. In a region between the first cooling section 16 and the second cooling section 18, the strand 12 is accessible from the outside. In this region, a diameter and/or wall thickness measuring apparatus 20 drawn in a dashed line is provided, comprising a terahertz transceiver 22, which emits terahertz radiation onto the tubular strand 12, as can be seen in FIG. 1 at the arrow 24. The terahertz radiation penetrates the tubular strand 12 and is reflected on the boundary surfaces of the strand 12, in particular its outer and insides. The reflected terahertz radiation is in turn received by the terahertz transceiver 22. The measuring apparatus 20 is in connection with an evaluation apparatus 28 via a data connection 26. The evaluation apparatus 28 determines, based on the reflected terahertz radiation, at least the wall thickness of the wall of the strand 12 facing the terahertz transceiver 22 and, if applicable, also the wall thickness of the wall of the strand 12 opposite the terahertz transceiver 22 but also its diameter.

The measuring apparatus 20 also comprises a first temperature sensor 30, in the present example a pyroelectric temperature sensor 30. The first temperature sensor 30 measures, along the directions indicated by the arrows 32 and 34, the thermal radiation originating from the strand 12 and with it a first temperature of the outside of the strand 12 at a first position 36 in the longitudinal direction of the strand 12 as well as a second temperature of the outside of the strand 12 at a second position 38 in the longitudinal direction of the strand 12. As is visible in FIG. 1, the first temperature sensor 30 measures the first temperature and the second temperature along the directions 32 and 34 symmetrically at the same angles to the strand surface. The measurement values of the first and second temperatures are also provided to the evaluation apparatus 28 via the connection 26. The evaluation apparatus 28 calculates the temperature within the tubular strand 12 and/or on the inside of the tubular strand 12, for example, at the second position 38 of the tubular strand 12 from a comparison of the measured first and second temperatures and taking into account the conveying speed of the strand 12, the thermal capacity and the thermal conductivity of the strand material as well as the measured wall thickness and the diameter of the strand 12. The calculation can take place as explained on the basis of iterative finite element methods.

It is possible, for example, to determine a radial temperature profile over, for example, the wall portion of the tubular strand 12 facing the temperature sensor 30. It is also possible that the transceiver 22 and the temperature sensor 30 are rotated about the longitudinal axis of the strand 12 so that both a wall thickness measurement and a measurement of the first and second temperatures at multiple locations distributed over the circumference of the strand 12 at the first or respectively second position can take place. In this manner, a temperature profile of the strand 12 can also be calculated over the circumference of the strand 12 in the interior or at its inside.

On the basis of the ascertained temperature values in the interior of the strand 12 or respectively on its inside, the refractive index, the absorption, and the shrinkage of the strand material, which are known to be temperature-dependent, can be determined more exactly. With better knowledge of the mentioned properties, considerably more exact wall thickness and diameter values can be generated, both for the hot values at the measurement location and also predicted after its cooling, for example, to room temperature.

The values ascertained by the evaluation apparatus 28 for the wall thickness and the temperature are provided in the example shown via a data connection 40 of a control and/or regulation apparatus 42 of the device. On this basis, the control and/or regulation apparatus 42 can control and/or regulate the extrusion device 10 via another data connection 44 and, for example, a conveying apparatus comprised by this for the strand 10.

LIST OF REFERENCE SIGNS

10 Extrusion device
12 Tubular strand
14 Conveying direction
16 First cooling section
18 Second cooling section
20 Diameter and/or wall thickness measuring apparatus
22 Terahertz transceiver
24 Terahertz radiation
26 Data connection
28 Evaluation apparatus
30 Temperature sensor
32 Temperature measuring direction
34 Temperature measuring direction
36 First position
38 Second position
40 Data connection
42 Control and/or regulation apparatus
44 Data connection

The invention claimed is:

1. A device for determining a temperature of a tubular strand conveyed out of an extrusion device, comprising:
at least one temperature sensor configured to measure a first temperature of an outside of the tubular strand at a first position of the tubular strand, wherein the first temperature is measured after the tubular strand passes through a cooling section positioned downstream of the extrusion device; and
an evaluation apparatus configured to,
determine a difference between the first temperature and a second temperature of the outside of the tubular strand that taken at a second position of the tubular strand, wherein the second position is spaced apart from the first position along a conveying direction of the tubular strand, and
determine at least one of a temperature within the tubular strand or a temperature on an inside of the tubular strand at a position of the tubular strand based on the the difference between the first and second temperature,
wherein the second temperature is higher than the first temperature due to thermal conduction from the inside of the tubular strand.

2. The device according to claim 1, further comprising a second temperature sensor configured to measure the second temperature.

3. The device according to claim 1, wherein the at least one temperature sensor is further configured to measure the second temperature.

4. The device according to claim 1, wherein the at least one temperature sensor comprises a contactless temperature sensor.

5. The device according to claim 1, wherein the evaluation apparatus uses a finite element method to determine the at least one of the temperature within the tubular strand or the temperature on the inside of the tubular strand based on the difference between the first and second temperature.

6. The device according to claim 1, wherein:
the at least one temperature sensor is configured to measure the first temperature at multiple locations distributed over a circumference of the tubular strand at the first position;
the evaluation apparatus is configured to compare the temperature measured at multiple locations distributed over the circumference of the tubular strand with the second temperature at multiple locations distributed over the circumference of the tubular strand at the second position; and
determine at least one of the temperature within the tubular strand or the temperature on the inside of the tubular strand at multiple locations distributed over the circumference of the tubular strand at the position of the tubular strand based on the comparison.

7. The device according to claim 6, wherein the at least the one temperature sensor is rotatable at least in portions over the circumference of the tubular strand.

8. The device according to claim 1, further comprising a measuring apparatus configured to measure at least one of a diameter or a wall thickness of the tubular strand at one of the first position and the second position of the tubular strand.

9. The device according to claim 8, wherein the evaluation apparatus is configured to determine at least one of the temperature within the tubular strand or the temperature on the inside of the tubular strand using at least one of the measured diameter and the measured wall thickness.

10. The device according to claim 8, wherein the measuring apparatus comprises a terahertz radiation measuring apparatus.

11. The device according to claim 10, wherein the evaluation apparatus is further configured to determine at least one of a diameter and a wall thickness of the tubular strand after reaching a final shape based on at least one of: (i) the diameter measured at one of the first position and the second position of the tubular strand; (ii) the measured wall thickness of the tubular strand; and (iii) a determined expected shrinkage.

12. The device according to claim 1, wherein the evaluation apparatus is further configured to determine an expected shrinkage of the tubular strand based on a temperature-dependent expansion coefficient of a material of the tubular strand starting from the position of the tubular strand at which at least one of the temperature within the tubular strand is determined or the position on the inside of the tubular strand where the temperature is determined, until the tubular strand reaches a final shape.

13. The device according to claim 1, wherein the evaluation apparatus is further configured to determine a refractive index of a material of the tubular strand based on the determined temperature.

14. The device according to claim 1, further comprising a control apparatus configured to control the extrusion device based on at least one of the determined temperature within the tubular strand and the determined temperature on the inside of the tubular strand.

15. A method for determining a temperature of a tubular strand conveyed out of an extrusion device, comprising:
measuring a first temperature of an outside of the tubular strand at a first position of the tubular strand;
measuring a second temperature of the outside of the tubular strand at a second position of the tubular strand, wherein the second position is spaced apart from the first position along a conveying direction of the tubular strand and the first temperature is measured after the tubular strand passes through a cooling section positioned downstream of the extrusion device;
determining a difference between the first temperature with the second temperature; and
determining at least one of: (1) a temperature within the tubular strand; and (2) a temperature on an inside of the tubular strand at a position of the tubular strand based on the difference between the first and second temperature,
wherein the second temperature is higher than the first temperature due to thermal conduction from the inside of the tubular strand.

16. The method according to claim 15, wherein at least the first temperature is measured contactlessly.

17. The method according to claim 15, wherein at least one of the temperature within the tubular strand and the temperature on the inside of the tubular strand is determined from the difference between the first and second temperatures using a finite element method.

18. The method according to claim 15, wherein the first temperature is measured at multiple locations distributed over a circumference of the tubular strand at the first position, and wherein the temperature measured at multiple locations distributed over the circumference of the tubular strand is also compared with the second temperature at multiple locations distributed over the circumference of the tubular strand at the second position.

19. The method according to claim 18, wherein at least one of: (i) the temperature within the tubular strand; and (ii) the temperature on the inside of the tubular strand is determined at multiple locations distributed over the circumference of the tubular strand at the position of the tubular strand from the comparison of the first temperature to the second temperature.

20. The method according to of claim 15, wherein the temperature of the tubular strand is determined at multiple locations within the tubular strand at the position of the tubular strand at which the temperature within the tubular strand is determined.

21. The method according to claim 15, wherein the temperature of the tubular strand is determined at multiple locations within the tubular strand at the position of the tubular strand at which the temperature on the inside of the tubular strand is determined.

22. The method according to claim 15, further comprising measuring at least one of: (i) a diameter; and (ii) a wall thickness of the tubular strand at at least one of the first position and the second position of the tubular strand.

23. The method according to claim 22, wherein at least one of the diameter and the wall thickness is used to determine at least one of: (i) the temperature within the tubular strand and (ii) the temperature on the inside of the tubular strand.

24. The method according to claim 23, further comprising determining an expected shrinkage of the tubular strand at a final shape based on a temperature-dependent expansion coefficient of a material of the tubular strand starting from the position of the tubular strand at which at least one of: (i) the temperature within the tubular strand is determined; and (ii) the temperature within the inside of the tubular strand is determined.

25. The method according to claim 22, wherein at least one of: (i) the diameter; and (ii) the wall thickness of the tubular strand after reaching a final shape is determined based on at least one of: (i) the diameter measured at the first position; and (ii) the diameter measured at the second position, and based on the determined expected shrinkage.

26. The method according to claim 15, wherein a refractive index of a material of the tubular strand is determined based on the determined temperature.

27. The method according to claim 15, further comprising controlling the extrusion device based on at least one of: (i) the determined temperature within the tubular strand; and (ii) the determined temperature within the inside of the tubular strand.

* * * * *